United States Patent Office 3,718,391
Patented Feb. 27, 1973

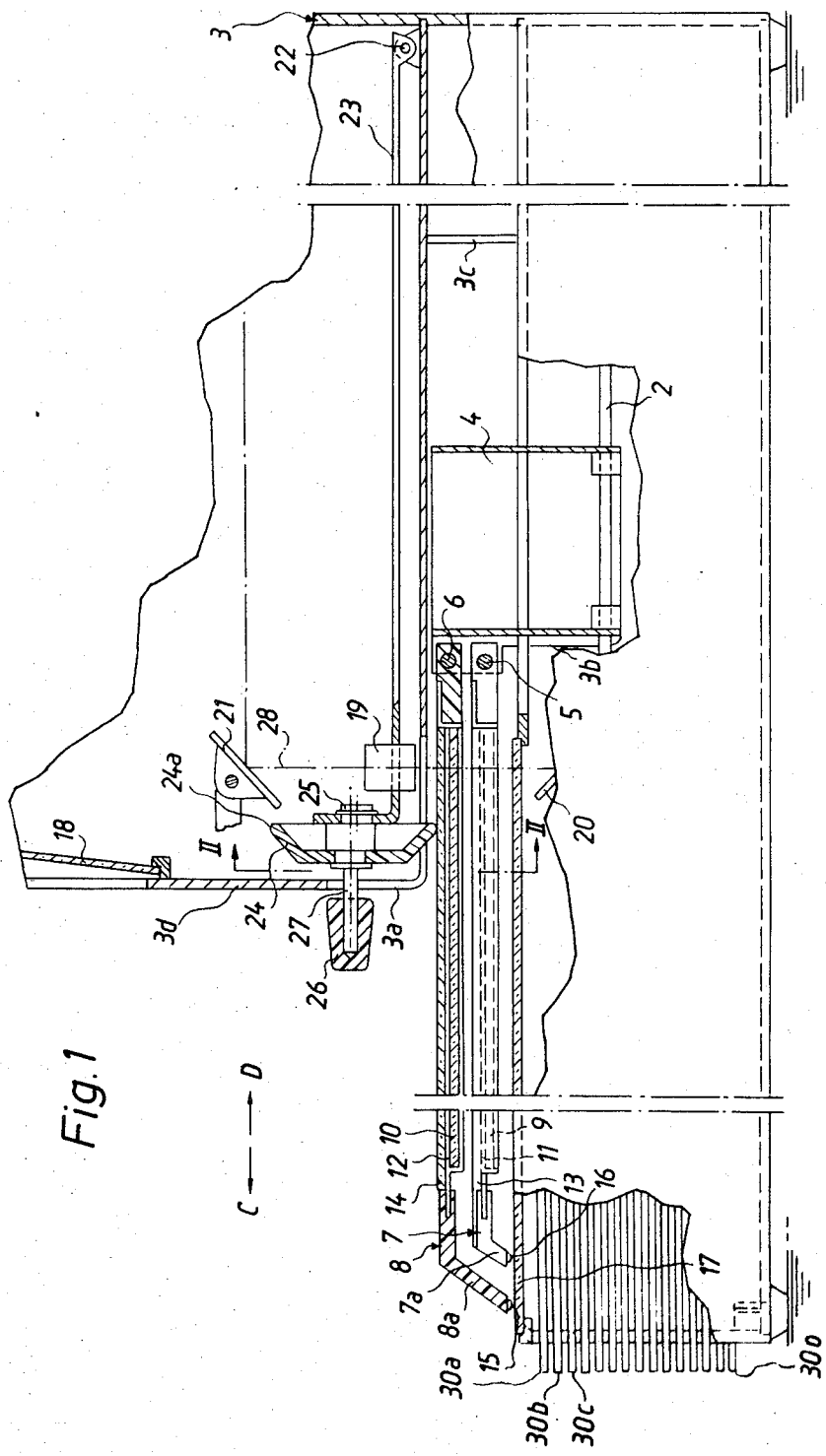

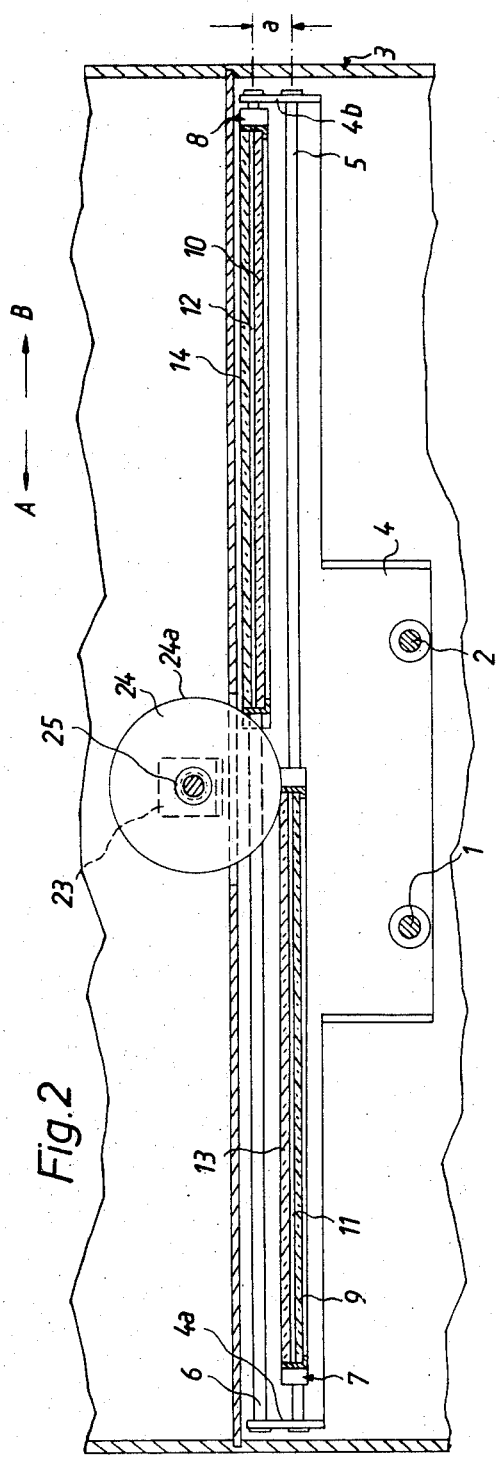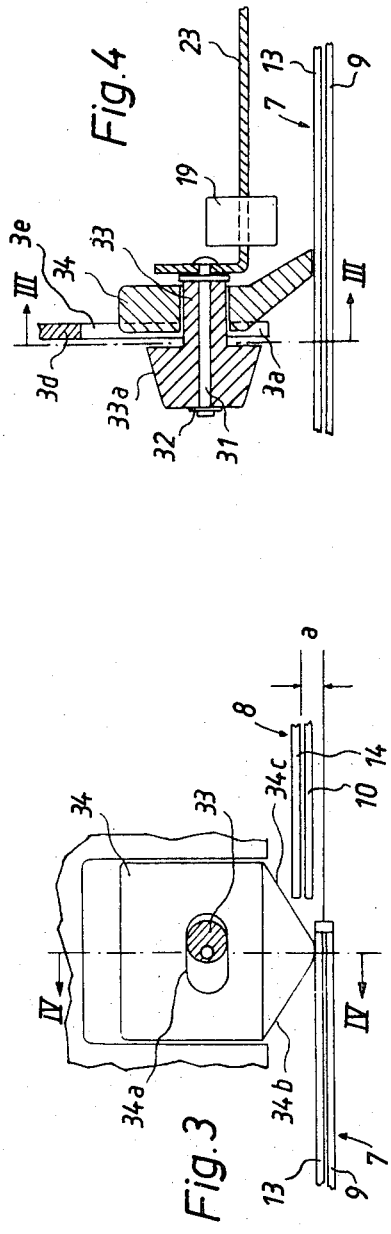

3,718,391
MICROFILM READING APPARATUS
Josef Pfeifer and Kasimir Ambraschka, Unterhaching, and Adolf Koopmann, Wilfried Hofmann, Karl-Heinz Dietrich, and Walter Rauffer, Munich, Germany, assignors to Agfa-Gevaert Aktiengesellschaft, Munich, Germany
Filed Mar. 28, 1972, Ser. No. 238,762
Claims priority, application Germany, Mar. 29, 1971,
P 21 15 205.6
Int. Cl. G03b 3/00
U.S. Cl. 353—101         13 Claims

ABSTRACT OF THE DISCLOSURE

A microfilm reader wherein discrete microfilm sheets are removably received in holders having transparent top panels and movable forwardly and rearwardly as well as sideways within the confines of a housing to place selected portions of microfilm sheets into register with a projection lens. The lens is mounted at the free end of a lever which is pivotable in the housing and further carries a block- or roller-shaped follower which rests on the top panel of the selected holder. That surface of the follower which abuts against the adjacent top panel is dimensioned and configurated in such a way that it can simultaneously abut against two adjacent top panels during shifting of one or more holders in order to place a selected portion of a selected microfilm sheet into register with the lens. This reduces the likelihood of shocks to the lens. The distance between the lens and the nearest microfilm sheet is adjustable by a mechanism which is installed between the lever and the follower and serves to insure that the focal plane of the lens can be made to coincide with the plane of the selected microfilm sheet.

BACKGROUND OF THE INVENTION

The present invention relates to microfilm reading apparatus in general, and more particularly to improvements in microfilm readers of the type wherein any one of several microfilm sheets can be rapidly moved to a position in which a selected portion of such sheet is in register with a projection lens which projects the image of the selected sheet portion onto a screen.

It is already known to provide a microfilm reading apparatus with several holders which serve to removably accommodate discrete microfilm sheets and are movable relative to the projection lens to place a selected portion of a selected microfilm sheet into a position in which the image of the selected sheet portion is observable on the projection screen. Such apparatus are normally provided with manually operated adjusting means for the projection lens; the adjusting means is manipulated whenever a holder is moved away from the projection position and is replaced by another holder. The support for the projection lens is fixed and, since the holders are located in different planes, the lens must be adjusted whenever a different holder is moved to the projection position in order to insure that the focal plane of the lens coincides, at least substantially, with the plane of the selected microfilm sheet. Such adjustments of the lens prior to each reading consume much time and constitute a tedious operation, especially if the user of the apparatus wishes to read selected portions of a large number of microfilm sheets.

SUMMARY OF THE INVENTION

An object of the invention is to provide a microfilm reading apparatus wherein the projection lens is mounted in such a way that a single adjustment of the lens normally suffices even if the user of the apparatus must repeatedly move different microfilm sheet holders into a predetermined projection position.

Another object of the invention is to provide a novel and improved microfilm reading apparatus wherein the projection lens is mounted in such a way that its focal plane automatically coincides with the plane of the microfilm which is placed into projection position.

A further object of the invention is to provide the apparatus with novel and improved means for accurately adjusting the position of the projection lens with reference to holders for microfilm sheets.

An additional object of the invention is to provide a microfilm reading apparatus with novel and improved means for preventing the transmission of excessive shocks to the projection lens during transport of microfilm sheet holders to and/or from projection position.

Still another object of the invention is to provide a microfilm reading apparatus which embodies the above-outlined features and is capable of storing a large number of microfilm sheets in a small area.

A further object of the invention is to provide a microfilm reading apparatus wherein the combined time which is required for observation of a given number of different microfilm sheets is substantially less than in presently known microfilm reading apparatus and whose manipulation is less cumbersome and less tiresome than the manipulation of known apparatus.

The invention is embodied in a microfilm reading apparatus which comprises a housing, a plurality of microfilm sheet holders including first and second holders which are mounted in the housing for movement in parallel planes to and from a projection position and each of which has a light transmitting panel located at a predetermined distance from the respective microfilm sheet (such panels are preferably horizontal and are preferably located directly above the respective microfilm sheets), a projection lens which serves to project the images of selected portions of selected microfilm sheets onto a projection screen, carrier means which supports the projection lens for movement toward and away from the planes of the holders, and follower means provided on the carrier means (preferably in close or immediate proximity of the projection lens) and having at least one (circular or straight) surface which, in at least one selected position of the first and second holders, simultaneously abuts against the light transmitting panels of the first and second holders. The projection lens is preferably located above the holder which occupies the projection position, and the apparatus preferably further comprises adjusting means which may be interposed between the follower means and the carrier means and is actuatable (for example, by hand through the intermediary of a handgrip member which is accessible from without the housing) to change the distance between the projection lens and the panel of that holder which occupies the projection position. The carrier means preferably comprises a lever which is pivotable in the housing about an axis remote from the projection lens and follower means.

The aforementioned surface of the follower insures that the follower can "ride" from a lower holder onto an upper holder or vice versa, and the carrier means insures that the follower invariably abuts against the panel of that holder which occupies the projection position. If desired, the follower can be biased by resilient means against the holder in projection position.

The novel features which are considered as characteristic of the invention are set forth in particular in the appended claims. The improved microfilm reading apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a fragmentary longitudinal vertical sectional view of a microfilm reading apparatus which embodies one form of the invention;

FIG. 2 is a fragmentary transverse vertical sectional view as seen in the direction of arrows from the line II—II of FIG. 1;

FIG. 3 illustrates in an enlarged transverse vertical sectional view a detail in a slightly modified microfilm reading apparatus, the section being taken in the direction of arrows as seen from the line III—III of FIG. 4; and FIG. 4 is a longitudinal vertical sectional view as seen in the direction of arrows from the line IV—IV of FIG. 3.

DESCRIPTION OF THE PREFERRED EMBODIMENTS

Referring first to FIGS. 1 and 2, there is shown a portion of a microfilm reading apparatus which comprises a housing 3 supporting two parallel horizontal guide members in the form of tie rods 1 and 2. The tie rods 1, 2 support and guide a reciprocable carriage 4 which is movable therealong in directions indicated by arrows C and D, namely, toward and away from the observer of a projection screen 18 which is mounted in the front wall of the upper portion of the apparatus at a level above the carriage 4. The latter supports two additional horizontal guide members or tie rods 5 and 6 which are shown as being normal to the tie rods 1, 2 and respectively carry reciprocable slides or holders 7, 8. The frames of the holders 7, 8 are rigidly connected with transparent base plates or panels 9, 10 serving as supports or platforms for removable microfilm sheets 11 and 12. Furthermore, the frames of the holders 7, 8 (which are not only reciprocable along but also pivotable about the respective tie rods 5, 6) respectively support pivotable top plates or panels 13, 14 which overlie the respective microfilm sheets 11, 12. Each of the holders 7, 8 has at its front end (namely, at that end which is remote from the respective tie rod 5, 6) a downwardly extending lug or projection 7a, 8a normally resting on a transparent horizontal cover plate 17 constituting the upper wall of a forwardly extending portion of the housing 3. This portion of the housing 3 extends forwardly beyond the general plane of the screen 18. As shown in FIG. 1, the projections 7a, 8a of the holders 7, 8 are provided with feet 16, 15 preferably consisting of a suitable synthetic plastic material having good sliding characteristics. The feet 15, 16 rest on the transparent cover plate 17 under the action of gravity, i.e., due to the weight of the respective holders 7, 8.

The apparatus further comprises a projection lens 19 which serves to project the images of selected portions of microfilm sheets 11, 12 onto the screen 18. When the apparatus is in use, a light source (not shown) directs a beam of light upon the selected portion of the microfilm sheet 11 or 12 (such light beam is reflected by a mirror 20 before it reaches the selected portion of the sheet 11 or 12), and the image of such selected sheet portion is thereupon projected by the lens 19 onto a second mirror 21 (see the optical axis 28 of the lens 19 in FIG. 1) which reflects the image onto at least one further mirror (not shown) before the image reaches the screen 18. The mirrors 20, 21 are respectively mounted below and above the planes of the holders 7, 8, and the lens 19 is located between the mirror 21 and the upper holder 8.

The projection lens 19 is mounted at the front end of an elongated carrier here shown as a lever 23 which is pivotable in the housing 3 about a horizontal axis, as at 22, and is mounted at a level above the upper tie rod 6 of the carriage 4. A rotary follower 24 at the front end of the lever 23 abuts against the top panel 13 or 14, depending upon whether the user of the apparatus has placed the holder 7 or 8 into register with the lens 19. It will be noted that the holders 7, 8 are movable in parallelism with the pivot axis 22 of the lever 23 and that the combined width of the holders 7, 8 is slightly less than the width of the housing 3 (see FIG. 2) so that the user can move the holder 7 or 8 sideways in order to enable the follower 24 to rest on the top panel 13 or 14.

The follower 24 resembles a roller or wheel mounted on an eccentric shaft 25 which can be rotated by means of a handgrip member or knob 26. The latter is accessible to the user in front of the screen 18 at a level above the cover plate 17. The shaft 25 is rotatable in the front portion of the carrier lever 23 and is connected with the shaft 27 of the knob 26. The shaft 27 extends through a vertical slot 3a which is provided in an upright front wall 3d of the housing 3. By rotating the shaft 25 through the intermediary of the knob 26 and shaft 27, the user of the apparatus can change the distance between the axis of the follower 24 and the projection lens 19; this, in turn, changes the distance between the lens 19 and the top panel 13 or 14 on which the peripheral surface 24a of the follower 24 rests. In other words, by rotating the knob 26, the user can change the distance between the lens 19 and the microfilm sheet 11 or 12. This enables the user to effect an accurate adjustment of the position of the lens 19 so that the focal plane of this lens coincides with the plane of the selected microfilm sheet 11 or 12.

FIG. 2 shows that the radius of the follower 24 is relatively large, preferably a multiple of the distance $a$ between the planes of the holders 7, 8 or microfilm sheets 11 and 12. Consequently, when the holder 8 is shifted from its left-hand end position or an intermediate position to the right-hand end position shown in FIG. 2, the follower 24 descends from the top panel 14 onto the top panel 13 of the holder 7 without any appreciable shock. The same holds true when the holder 8 is thereupon pushed in a direction to the left so as to cause the peripheral surface 24a of the follower 24 to move upwardly and to roll along the upper side of the top panel 14. When the holder 8 dwells in the end position of FIG. 2, the follower 24 rests on the top panel 13 of the lower holder 7 and the user of the apparatus can rapidly place a desired portion of the microfilm sheet 11 into register with the lens 19 merely by moving the holder 7 along the tie rod 5 and/or by moving the carriage 4 along the tie rods 1, 2. The directions in which the holders 7, 8 are movable lengthwise of the tie rods 5, 6 are indicated by arrows A and B shown in FIG. 2.

The thickness of the top panel 13 preferably equals the thickness of the top panel 14. Therefore, when the peripheral surface 24a of the follower 24 rests on the top panel 13, the distance between the lens 19 and the plane of the microfilm sheet 11 is the same as the distance between the microfilm sheet 12 and the lens 19 when the surface 24a of the follower 24 rests on the top panel 14 of the holder 8. Consequently, if the position of the lens 19 was accurately adjusted by the adjusting means 25–27 while the surface 24a of the follower 24 was resting on the top panel 13, the knob 26 requires no further manipulation when the follower 24 is caused to rest on the top panel 14 of the holder 8, or vice versa, because the carrier lever 23 automatically insures that the distance between the lens 19 and the microfilm sheet therebelow is the same regardless of whether the follower 24 rests on the top panel of the holder 7 or 8. The knob 26 then merely serves to effect (when necessary) minor adjustments in order to insure a highly accurate coincidence between the focal plane of the lens 19 and the plane of the microfilm sheet 11 or 12.

In order to insure that the top panel 13 or 14 cannot be moved forwardly or rearwardly (arrows C and D in FIG. 1) beyond the peripheral surface 24a of the follower 24, the apparatus preferably comprises suitable stops 3b and 3c which limit the extent of movement of the carriage 4 along the tie rods 1 and 2. This prevents the peripheral surface 24a of the follower 24 from slipping off the front or rear edge portion of the holder 7 or 8 when the two holders are moved by the carriage 4 in the direction indicated by the arrow C or D. In the absence of the stops 3b and 3c, the carriage 4 would be likely to jam if the relatively narrow peripheral surface 24a of the follower 24 were allowed to slip off the front or rear edge portion of the top panel 13 or 14.

The apparatus further comprises additional stops 4a and 4b (shown in FIG. 2) which limit the extent of reciprocatory movement of the holders 7, 8 in the directions indicated by arrows A and B. The purpose of the stops 4a, 4b is to prevent the follower 24 from descending onto the cover plate 17 between the holders 7 and 8. The likelihood of such engagement between the cover plate 17 and the follower 24 is further reduced if the carriage 4 supports three or more holders all of which are movable transversely of the tie rods 1, 2 and relative to each other so as to place a selected microfilm sheet into register with the lens 19.

The projections or front portions 7a, 8a of the holders 7, 8 can serve as handles which can be grasped to move the respective holder along the tie rod 5 or 6 and/or to move the carriage 4 along the tie rods 1, 2 when the user manipulates the holder 7 or 8 in order to place a selected portion of the microfilm sheet 11 or 12 into register with the projection lens 19. The peripheral surface 24a of the follower 24 then rests on the top panel 13 or 14 so that the focal plane of the lens 19 coincides with the plane of the sheet 11 or 12 while the optical axis (phantom line 28) of the lens 19 intersects the selected portion of the sheet 11 or 12. The screen 18 will furnish a sharp image of the selected portion of the sheet 11 or 12 because, once the position of the lens 19 has been properly adjusted with reference to the sheet 11, the accurate adjustment will remain intact when the sheet 11 is moved out of the way and the lens 19 is located above a selected portion of the sheet 12, or vice versa. As mentioned above, minor adjustments of the lens 19 can be effected by rotating the knob 26. That holder whose microfilm sheet is to be moved out of the way is simply pushed or pulled to one of its end positions, i.e., the holder 8 will be pushed into abutment with the stop 4b of the carriage 4 if the user of the apparatus wishes to observe a selected portion of the microfilm sheet 11, and the holder 7 will be pushed or pulled into abutment with the stop 4a if the user wishes to project the image of a selected portion of the microfilm sheet 12.

The follower 24 will rotate in response to movement of the holder 7 or 8 along the tie rod 5 or 6 but the peripheral surface 24a of the follower 24 will merely slide along the top panel 13 or 14 if the carriage 4 is moved along the tie rods 1 and 2. As mentioned above, the stops 3b and 3c in the housing 3 prevent the carriage 4 from moving through such a distance (arrow C or D) that the peripheral surface 24a of the follower 24 could slip off the front or rear edge portion of the top panel 13 or 14. In other words, the stops 3b and 3c insure that the surface 24a of the follower 24 invariably rests on the upper side of the panel 13 or 14. If the user wishes to alternately observe selected portions of sheets 11 and 12 without changing the position of the carriage 4 and/or holder 7 or 8, the knob 26 is manipulated to move the lens 19 up or down so that the focal plane of the lens 19 coincides with the plane of the sheet 11 or 12. The throw of the eccentric portion of the shaft 25 is preferably sufficient to insure that the focal plane of the lens 19 can be made to coincide with the plane of the sheet 11 or 12 without changing the position of the carriage 4 and/or holder 7 or 8 relative to the housing 3.

The aforementioned forwardly extending portion of the housing 3 below the cover plate 17 is preferably provided with a series of superimposed horizontal drawers 30a, 30b, 30c, ... 30o which may be of expansible type or have a constant width and serve for storage of spare microfilm sheets which can be inserted into the holder 7 or 8 in place of the sheet 11 or 12.

When the front portions 7a, 8a of the holders 7, 8 rest on the transparent cover plate 17, the holders are located in parallel horizontal planes. In order to place a selected holder into projection position and to further place a selected portion of the selected microfilm sheet 11 or 12 into register with the lens 19, the user of the apparatus simply manipulates the front portions 7a, 8a whereby the follower 24 rides over the panel 13 or 14 and/or from the panel 13 onto the panel 14 or vice versa without any appreciable shock to the projection lens 19. The stops 3b, 3c and/or 4a, 4b prevent the follower 24 from leaving the surface of the panel 13 and/or 14 and, once properly adjusted by the knob 26, the lens 19 is automatically located in an optimum position with reference to the microfilm sheet in the selected holder when such holder assumes the projection position. The lever 23 constitutes a very simple and inexpensive carrier for the projection lens 19 and follower 24; its pivot axis 22 is preferably remote from the parts 19, 24 and is mounted in such a way that the lens 19 is movable toward or away from the plane of the panel 13 or 14 which forms part of the holder occupying the projection position. Since the follower 24 can roll on the panel 13 or 14 when the respective holder moves lengthwise of the tie rod 5 or 6, and since the upper sides of the panels 13 and 14 are preferably smooth, the shifting of holders with or relative to the carriage 4 requires the exertion of a small force. Therefore, the user of the apparatus need not even look at the holders but can concentrate instead on observation of the screen 18 while the fingers of one or both hands manipulate the front portion 7a and/or 8a in order to place a selected holder into projection position as well as to place a selected portion of the microfilm sheet in the selected holder into register with the lens 19. FIG. 1 shows the upper holder 8 in projection position, i.e., the surface 24a of the follower 24 rests on the top panel 14. In FIG. 2, the surface 24a of the follower 24 rests on the top panel 13 of the lower holder 7. The knob 26 is actuated only when necessary, i.e., when the position of the lens 19 with reference to the lever 23 has been changed to a slight degree so that is becomes necesary to adjust the follower 24 in order to place the focal plane of the lens 19 into the plane of that microfilm sheet which occupies the projection position.

It is clear that the lever 23 can be replaced with another carrier, for example, with a slide which is movable up and down away from or toward the holder which occupies the projection position. Also, the housing 3 can accommodate two or more holders which are preferably located in parallel horizontal planes. Furthermore, the tie rods 1, 2 need not be exactly normal to the tie rods 5, 6 and the holders 7, 8 can be mounted in the housing 3 in such a way that each thereof is movable in several directions without necessitating the provision of the carriage 4.

The radius of the surface 24a on the follower 24 is such that this surface can simultaneously contact the panels 13, 14 during rolling of the follower 24 from the holder 7 onto the holder 8 or vice versa. In other words, the surface 24a can bridge the distance a between the planes of the sheets 11 and 12.

Referring to FIGS. 3 and 4, there is shown a modified construction of the means for adjusting the distance between the projection lens 19 on the carrier lever 23 and the planes of the microfilm sheet in the holder 7 or 8. The front portion of the lever 23 is rigidly connected with a shaft 31 which extends forwardly through the slot 3a of the wall 3d and supports a handgrip portion or knob 33a which is held against axial movement by a split ring 32. The rear or inner portion 33 of the knob 33a constitutes an eccentric sleeve which is rotatable in a block-shaped follower 34 preferably consisting of a synthetic plastic material. The tip of the follower 34 rests on the upper side of the top panel 13 or 14, and this follower is held by the wall 3d against angular movement about the axis of the shaft 31. Thus, when the user rotates the knob 33a, the sleeve 33 cooperates with the follower 34 to move the lens 19 up or down to thereby accurately adjust the position of the lens so that the focal plane of this lens coincides with the plane of the microfilm sheet in the holder 7 or 8. The front wall 3d of the housing 3 has a vertical guide slot or recess 3e wherein the front portion of the follower 34 is movable up and down but cannot rotate relative to the housing.

FIG. 3 shows that the follower 34 is provided with a horizontal slot 34a for the sleeve 33 and that the lower end portion of the follower resembles a wedge flanked by two relatively long mutually inclined surfaces 34b, 34c which converge toward each other in a direction downwardly and away from the sleeve 33. The lengths and positions of the surfaces 34b, 34c are such that they perform the same function as the peripheral surface 24a of the rotary follower 24, i.e., they enable the follower 34 to slide off the top panel 13 onto the top panel 14 or vice versa without any appreciable shock when the holder 7 or 8 is moved lengthwise of the respective tie rod 5 or 6. As shown in FIG. 3, the distance a between the planes of microfilm sheets in the holders 7, 8 is substantially less than one-half the width of the follower 34. Also, the distance between the uppermost and lowermost portions of the surface 34b or 34c substantially exceeds the distance a; such dimensioning of the follower 34 insures that the transfer of the follower from the top panel 13 onto the top panel 14 or vice versa can take place without excessive shock to the lens 19. Also, the surface 34a or 34b contacts both holders during transfer of the follower 34 from the panel 13 onto the panel 14 or vice versa.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims.

We claim:

1. In a microfilm reading apparatus, a combination comprising a housing; a plurality of microfilm sheet holders including first and second holders mounted in said housing for movement in parallel planes and each having a light transmitting panel located at a predetermined distance from the respective microfilm sheet; a projection lens; carrier means supporting said lens for movement toward and away from the planes of said holders; and follower means provided on said carrier means and having at least one surface which, in at least one selected position of said first and second holders, simultaneously abuts against the light transmitting panels of said first and second holders.

2. A combination as defined in claim 1, wherein said follower means is adjacent to said projection lens and said panels are located above the respective microfilm sheets, said lens being located at a level above the plane of the nearest transparent panel.

3. A combination as defined in claim 1, further comprising adjusting means interposed between said follower means and said carrier means and actuatable to change the distance between said lens and the panel against which said follower means abuts.

4. A combination as defined in claim 1, wherein said carrier means comprises a lever which is pivotable in said housing about an axis remote from said lens and said follower means.

5. A combination as defined in claim 1, wherein said follower means comprises a rotary member which is rotatably supported by said carrier means, said surface constituting the peripheral surface of said rotary member.

6. A combination as defined in claim 5, wherein the radius of said rotary member substantially exceeds the distance between the planes of transparent panels of said first and second holders.

7. A combination as defined in claim 5, further comprising adjusting means interposed between said rotary member and said carrier means and actuatable to change the distance between said lens and the panel against which said rotary member abuts, said adjusting means comprising an eccentric member rotatably supporting said rotary member and rotatably mounted in said carrier means and means for rotating said eccentric member relative to said carrier means.

8. A combination as defined in claim 7, wherein said means for rotating said eccentric member comprises a handgrip member which is accessible without said housing.

9. A combination as defined in claim 1, wherein each of said holders further comprises a second transparent panel, each microfilm sheet being removably received between the respective first mentioned and second panels and one panel of each holder being pivotable relative to the other panel to afford access to the respective microfilm sheet.

10. A combination as defined in claim 9, further comprising stop means provided in said housing for limiting the extent of movement of said holders relative to each other and relative to said housing.

11. A combination as defined in claim 10, wherein each of said holders is movable back and forth in a first direction and back and forth in a second direction substantially at right angles to said first direction, said stop means including at least one first stop for limiting the extent of movement of each holder in said first direction and at least one stop for limiting the extent of movement of each holder in said second direction.

12. A combination as defined in claim 1, wherein said housing comprises a portion located at a level below said holders and having means for storage of additional microfilm sheets.

13. A combination as defined in claim 12, further comprising a projection screen mounted in said housing at a level above said holders, said portion of said housing extending forwardly beyond said screen and being provided with a plurality of drawers for storage of microfilm sheets.

References Cited

UNITED STATES PATENTS 2,701,979   2/1955   Pratt et al. _____ 353—27

FOREIGN PATENTS 946,782   1/1964   Great Britain _____ 353—101

HARRY N. HAROIAN, Primary Examiner

U.S. Cl. X.R.

353—27